UNITED STATES PATENT OFFICE 2,658,070

CARBOALKOXYETHYLATION REACTIONS IN PRESENCE OF CERTAIN ANION-EXCHANGE RESINS

Claude J. Schmidle, Moorestown, and Richard C. Mansfield, Riverton, N. J., assignors to Rohm & Haas Company, Philadelphia, Pa., a corporation of Delaware No Drawing. Application February 1, 1952, Serial No. 269,582

13 Claims. (Cl. 260—478)

This invention concerns reacting compounds having active hydrogen, as in an alcoholic hydroxyl group or on a methylenic carbon, with compounds having an electron-deficient double bond under the influence of an anion-exchange resin having quaternary ammonium alkoxide groups. More particularly this invention deals with reacting by addition (1) a compound having a reactive hydrogen atom in an alcoholic hydroxyl group or on a carbon atom activated by being contiguous to one or more electron-withdrawing groups, such as carbonyl, carbamido, cyano, or nitro, or the like and (2) an acrylic ester in the presence of a said quaternary ammonium alkoxide resin.

Active methylenic compounds and alcohols have been caused to react with compounds having an electron-deficient double bond under the influence of such basic catalysts as sodium methylate or ethylate, sodium or potassium hydroxide, metallic sodium, sodium amide, potassium carbonate, trimethylbenzylammonium hydroxide, tetrahydroxyethylammonium hydroxide, piperidine, and the like. Before the addition products which are formed can be isolated, it is generally necessary to destroy these basic catalysts with acid and to separate the product from the neutralized or acidic mixture. When acrylic esters are taken as one of the reactants, the conversions or yields are not generally satisfactory.

When, however, an anion-exchange resin having quaternary ammonium alkoxide groups is used as a catalyst, conversions and yields from the reaction of an acrylic ester and a said compound are greatly improved. Side reactions are avoided. The process is simplified, since use of acid for neutralizing is no longer necessary and tedious separation steps are avoided. Furthermore, the catalyst is not destroyed in effecting separation of product.

Anion-exchange resins having quaternary ammonium alkoxide groups are new substances. Their preparation is described in application Serial No. 247,760, filed on September 21, 1951, by J. C. Hwa and assigned to a common assignee. The resins there described contain as functional groups quaternary ammonium groups which may be structurally represented

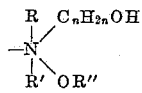

where $C_nH_{2n}$ represents an alkylene group, usually of two to three carbon atoms, R and R' stand for small alkyl groups (of not over five carbon atoms), or for an alkyl group and a benzyl group, or, if taken together, for a divalent chain which forms a heterocycle with the nitrogen (as in morpholino, pyrrolidino, or piperidino groups), and R'' represents the residue of a monohydric alcohol. The indicated valence of the nitrogen is attached to the resin nucleus. If these resins are made from a copolymer of styrene and a polyvinylbenzene which has been halomethylated, then the resin may be represented by the formula

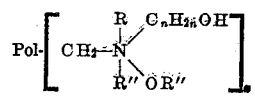

where $x$ is the number of functional groups in a resin unit.

If the quaternary ammonium group is formed in a resin having a polyamine chain, then the functional groups may be represented

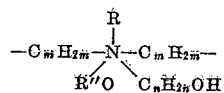

$C_mH_{2m}$ being the alkylene group of the polyamine chain. Here R is most commonly a methyl group.

Another type of quaternary ammonium alkoxide resin is described in application Serial No. 250,038, filed by J. C. Hwa on October 5, 1951, now Patent No. 2,630,428, also assigned to the common assignee.

The resinous quaternary ammonium alkoxides are made in a substantially anhydrous system, an alkylene oxide and an alcohol such as methyl, ethyl, propyl, butyl, or the like, being reacted with an insoluble resin having tertiary amine groups. The alkoxide resins are used in substantially anhydrous systems, if it is desired to maintain the alkoxide groups. In the presence of water these groups may be hydrolyzed. This serves, however, to prevent a side reaction between acrylic ester and water, if the latter happens to be present during the addition reaction of this invention.

As acrylic ester there is desirably used a lower alkyl acrylate—methyl, ethyl, propyl, or butyl acrylate. Other acrylic esters may, however, be used, particularly when a different or larger ester group is desired in the final product. For example, cyclohexyl acrylate can be used or hexyl acrylate or octyl acrylate to give alkoxypropionates with distinctly hydrophobic ester groups.

According to this invention there are reacted with the aid of a said quaternary ammonium alkoxide resin acrylic esters and compounds having reactive hydrogen. There are several types of such compounds. Alcohols, including thioalcohols, form one interesting class of reactants, yielding alkoxypropionates, which are useful as solvents, softeners, plasticizers, and chemical intermediates.

Another group of reactants comprises compounds having reactive hydrogen on a methyl, methylene, or methenyl carbon atom activated by juxtaposition to at least one electron-withdrawing group. One interesting type of such compounds includes the nitroalkanes, which by reaction with an alkyl acrylate yield nitro esters. These are useful for the preparation of nitro carboxylic acids, amino carboxylic acids, amino alcohols, and the like for use in preparation of synthetic resins, plasticizers, and drugs.

Another type of these reactants comprises compounds having two activating groups, as found in acetoacetates, acetoacetamides, acetoacetonitriles, cyanoacetates, cyanoacetamides, and the like C-alkyl substituted acetoacetates, malonates, malononitrile, malonamides, and the like C-alkyl substituted malonates, 1,3-diketones, and the like. These compounds may be summarized by the formula

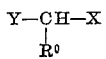

where Y is acyl, carbalkoxy, carbamido, or cyno, X is acyl, carbalkoxy, carbamido, or cyano, and R⁰ is hydrogen or lower alkyl.

The group Y may also be a hydrocarbon group including phenyl, naphthyl, and similar aryl groups, an aliphatic group, or a cycloaliphatic group. In this case X may be formyl, an acyl group or nitro group as above noted. If Y is aryl, X may be a cyano group, the aryl group together with the cyano group serving to activate the intermediate methylene or methenyl group.

The formyl and acyl groups have sufficient activating influence to render aliphatic aldehydes and ketones reactive to acrylic esters under the influence of a quaternary ammonium alkoxide resin.

Typical specific reactants include methanol, ethanol, isopropanol, n-propanol, butanol, isobutanol, sec.-butanol, hexyl alcohol, 2-ethylhexyl alcohol, octyl alcohol, 3,5,5 - trimethylhexyl alcohol, dodecyl alcohol, octadecyl alcohol, allyl alcohol, methalyl alcohol, oleyl alcohol, cyclopentano, cyclohexanol, dicyclopentenyl alcohol, dicylopentanyl alcohol, terpineols, benzyl alcohol, N,N-dimethylaminoethanol, tetrahydrofurfuryl alcohol, methoxyethanol, ethoxyethanol, phenoxyethanol, chlorophenoxyethanol, alkylphenoxyethanols, ethoxypropanol, octoxypropanol, ethoxyethoxyethanol, butoxyethoxyethanol, ethylene glycol, diethylene glycol, triethylene glycol propylene glycol, butylene glycols, dipropylene glycol, glycerine, α-glycerol ethers, pentaerythritol, sorbitol, and the like. Where more than one active hydrogen is available in a given compound, one or more of these may be reacted. The useful alcohols are mostly primary and secondary alcohols. While some tertiary alcohols have been found to give the desired type of reaction products, they do so but slowly and in low yields.

Along with the above alcohols there must be mentioned the thioalcohols. Typical and useful examples of these include butyl mercaptan, octyl mercaptan, dodecyl mercaptan, tert.-tetradecyl mercaptan and similar substances, including such compounds as mercaptoethanol.

Useful nitro compounds are represented by nitromethane, nitroethane, 1-nitropropane, 2-nitropropane, and nitrobutane, in which at least one hydrogen is available for reaction on the carbon next to the nitro substituent.

Typical compounds which can be used in the reaction of this invention and which are characterized by reactive methylenic hydrogen include methyl acetoacetate, ethyl acetoacetate, acetoacetamide, N - methylacetoacetamide, N-ethylacetoacetamide, acetoacetonitrile, methyl cyanoacetate, ethyl cyanoacetate, butyl cyanoacetate, cyanoacetamide, N-methylcyanoacetamide, ethyl methylacetoacetate, ethyl butylacetoacetate, dimethyl malonate, diethyl malonate, dibutyl malonate, dibutyl butylmalonate, dimethyl methylmalonate, malononitrile, malonamide, 2,4-pentanedione, benzoyl acetone, and the like.

Other examples of compounds having active methylenic hydrogen between two activating groups are the benzyl cyanides or phenylacetonitriles, typified by benzyl cyanide itself, o- or p - chlorophenylacetonitrile, p-methoxyphenylacetonitrile, p-methylphenylacetonitrile, phenyl-α-methylacetonitrile, o-phenylphenylacetonitrile, α- or β-naphthylacetonitrile, β-tetrahydronaphthylacetonitrile, and other arylacetonitriles having at least one hydrogen on the carbon atom between the cyano and aryl groups.

Ketones and aldehydes with active hydrogen can add to alkyl acrylates under the influence of a quaternary ammonium alkoxide resin. Typical reactants of this type are acetone, mesityl oxide, methyl ethyl ketone, methyl hexyl ketone, cyclopentanone, cyclohexanone, isobutyraldehyde, butyraldehyde, methylpropylacetaldehyde, valeraldehyde, tetrahydrofurfural, phenylacetaldehyde, α-ethyl-β-propylacrolein, etc.

Also reactive with acrylic esters are compounds having a —CH— or —CH₂— group between the ethylenic carbon atoms of a carbocycle or heterocycle, such as cyclopentadiene, indene, fluorene, 2-phenylindole, anthrone, etc.

The compounds described and illustrated above may be described as compounds having reactive hydrogen attached to the oxygen (or sulfur) of the functional group which characterizes alcohols—the hydroxyl group—or to a methylenic carbon which is activated by juxtaposition of an electron-withdrawing group. Such group may also be termed an electron-attracting group or an electrophilic group. Price (Chem. Rev. 29, 58) has arranged such groups in order of polarizing forces in connection with substitution and orientation in the benzene ring, —CONH₂, —COCH₃, —CHO, —COOCH₃, —SO₂CH₃, —CF₃, —C≡N, and —NO₂, all being meta directing groups. Here meta directing groups which are acid groups are excluded.

The active methylenic hydrogen may also be characterized as one which is present in a substance capable through loss of a proton of forming a carbanion, the ion thus resulting containing a carbon atom with an unshared electron pair. This hydrogen on a carbon atom is acidic. Under the influence of a basic catalyst it is exchangeable with deuterium. In an important subclass it is replaceable with sodium. Thus, this subclass of compounds can be distinguished by the presence of a

group which reacts with an alkali metal alcoholate to replace the indicated hydrogen with an alkali metal.

The reaction is carried out by bringing together an acrylic ester and a compound having reactive hydrogen of the kind defined above in the presence of a resinous quaternary ammonium alkoxide. The reaction is generally carried out between 0° and 90° C. A preferred range for reacting alcohols and reactive methylenic compounds is between 20° and 90° C., while reaction with a compound such as hydrogen cyanide is best accomplished between 0° and 25° C. By one method the process may be conducted batchwise. For example, one reactant and resin catalyst are mixed and the second reactant is added thereto. The rate of addition is adjusted to provide good control of the reaction. The three materials may in general be mixed in any order or combination, except where undesirable side reaction might result, and the reaction mixture stirred. If necessary, the temperature of the reaction mixture can be controlled by cooling or even heating as required. The reaction may be run in the presence of a solvent, if desired. Inert organic solvents are, of course, particularly desirable, if the compound having reactive hydrogen is a solid. Reaction mixture and resin catalyst are separated, as by filtration. The reaction product is isolated by distillation, extraction, or other conventional step.

The reaction may also be effected in a continuous manner by passing the reactants together over a resinous quaternary ammonium alkoxide. The resin catalyst is conveniently held in a column and the reactants passed through the column by up-flow or down-flow. The temperature of the column may be controlled by heating or cooling and/or by the rate at which reactants are supplied and withdrawn.

The process is illustrated by the following typical preparations.

Example 1

There are mixed 100 parts by weight of freshly distilled diethyl malonate and 28 parts by weight of a quaternary ammonium alkoxide resin having dimethyl hydroxyethyl ammonium methoxide substituents attached through methyl groups to the phenyl rings of a styrene-divinylbenzene copolymer. To this mixture over a period of two hours there are added 50 parts of redistilled ethyl acrylate. The mixture is stirred for 16 hours, left standing for 24 hours, and then filtered. The filtrate is distilled. At 115°–120° C./1.2 mm. a fraction of 64 parts by weight is taken. It is triethyl 1,1,3-propanetricarboxylate, being the addition product of one molecular proportion of ethyl acrylate and one molecular proportion of diethyl malonate.

A second fraction is collected at 155°–160° C./1.2 mm. in an amount of 26 parts by weight. It is diethyl γ,γ-dicarbethoxypimelate, being the addition product of two molecular proportions of ethyl acrylate and one molecular proportion of diethyl malonate.

The resin removed from the reaction mixture is still active and is capable of reuse in the same or in a similar reaction.

In place of ethyl acrylate methyl, propyl, or butyl acrylates may be used to introduce the corresponding carbalkoxy groups. In place of diethyl malonate any other malonate having hydrogen on the methylenic carbon may be used. In place of a malonate there may be used any other of the compounds having active methylenic hydrogen, as occurs in acetoacetates, cyanoacetates, 1,3-diketones, and the like. As catalysts there may be used not only the methoxide resin shown above, but other alkoxide resins. As a general rule it is best to use an alkoxide group which corresponds to the alcohol residue of the ester being reacted, although this is not essential.

Example 2

There are mixed 60 parts by weight of anhydrous ethyl alcohol and 40 parts by weight of a styrene-divinylbenzene copolymer having dimethyl hydroxyethyl ammonium ethoxide groups joined to the copolymer rings through methylene linkages. Thereto is added over a two hour period 100 parts by weight of freshly distilled ethyl acrylate. The temperature of the reaction mixture is held at 25°–30° C. with the aid of external cooling. The mixture is stirred for an hour and filtered. The filtrate is distilled to give 126 parts by weight of ethyl β-ethoxypropionate which comes over at 75°–81° C./26 mm.

In place of ethyl alcohol other alcohols may be used, as discussed above. In place of ethyl acrylate there may be reacted other acrylic esters. In each case an ether propionate is formed.

Example 3

Fifty parts of freshly distilled ethyl acrylate are added dropwise to a stirred mixture of 40 parts of methanol and 40 parts of the resin used in the previous example. The temperature of the mixture is maintained at 35°–40° C. When addition of ethyl acrylate is complete, the reaction mixture is stirred for five hours. The resin is removed by filtration and the filtrate is fractionally distilled. The fraction taken at 58°–62° C./20 mm. corresponds in composition to the desired product, ethyl β-methoxypropionate.

Similarly, there are reacted 43 parts of methyl acrylate and 40 parts of methanol on 20 parts of a styrene-divinylbenzene copolymer having dimethyl hydroxyethyl ammonium methoxide groups attached to the benzene nuclei through methylene groups. The product is obtained as the fraction distilling at 51°–56° C./22 mm. It corresponds in composition to methyl methoxypropionate. This product has a refractive index, $n_D^{20}$, of 1.4045.

Similarly, there are reacted together at temperatures of 45°–55° C. 64 parts of butyl acrylate and 125 parts of n-butanol on a quaternary ammonium butoxide resin of the same type as used above. The mixture is stirred for 16 hours, separated by filtration, and fractionally distilled. The fraction taken at 79°–84° C./0.6 mm. corresponds in composition to butyl butoxypropionate. It has a refractive index, $n_D^{20}$, of 1.4235.

Similarly, cyclohexyl alcohol and cyclohexyl acrylate are reacted together in tert.-butanol as a solvent in the presence of a dimethyl hydroxyethyl ammonium methoxide resin derived from a halomethylated styrene-divinylbenzene copolymer. The desired product, cyclohexyl cyclohexoxypropionate, distills at 90°–120° C./0.2 mm. and has a refractive index, $n_D^{20}$, of 1.4645.

Reaction of isopropyl acrylate and diethylene glycol as above leads to the diester,

$$(C_3H_7OOCCH_2CH_2OCH_2CH_2)_2O$$

which has a distillation range of 160°–165° C./1 mm.

Reaction of butyl acrylate and α-methyl glyceryl ether yields the ester

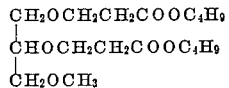

Other polyhydric alcohols can be reacted with acrylic esters in similar fashion to give mono- or poly-carboxyethyl ethers thereof.

*Example 4*

Fifty parts by weight of freshly distilled ethyl acrylate are added dropwise to a stirred mixture of 122 parts of nitromethane and 40 parts of a styrene-polyvinylbenzene copolymer having dimethyl hydroxyethyl ammonium ethoxide groups attached to the copolymer nuclei through methylene groups. The temperature of the mixture rises to 55° C. After all of the ethyl acrylate has been added, the mixture is stirred for an hour with the temperature of the mixture gradually falling to about 30° C. The mixture is filtered to remove the resin and the filtrate is distilled. At 100°–113° C./4.5 mm. there is obtained a fraction which corresponds in composition to ethyl γ-nitrobutyrate.

*Example 5*

To a mixture of 135 parts by weight of 2-nitropropane and 40 parts of the kind of resin used in Example 3 there is slowly added ethyl acrylate to a total amount of 50 parts. During the addition of this reaction the mixture is cooled to maintain the temperature thereof between 30° and 40° C. After completion of the addition the reaction mixture is stirred for five hours with the temperature at about 30° C. The resin is removed by filtration and the filtrate is distilled. The desired product, ethyl γ-methyl-γ-nitrovalerate, is obtained at 88°–92° C./1 mm.

In place of the above-used nitroalkanes there may be used other nitroalkanes having a hydrogen atom on the carbon atom adjacent the nitro group. Instead of ethyl acrylate there may be used methyl, propyl, or butyl acrylate, or the like.

Similarly, there are reacted at about 40° C. 44.5 grams of 1-nitropropane and 110 grams of ethyl acrylate in 25 grams of benzene on 25 parts of a styrene-divinylbenzene copolymer having attached thereto through methylene linkages dimethyl hydroxyethyl ammonium ethoxide groups. The mixture is stirred for 16 hours with the temperature dropping to 30° C. The reaction mixture is filtered and the filtrate is fractionally distilled. The fraction taken at 89°–92° C./1 mm. corresponds in composition to ethyl γ-nitrohexoate. At 159°–165° C./1 mm. another fraction is obtained. This is diethyl γ-nitro-γ-ethylpimelate. These fractions are oils.

*Example 6*

Fifty parts of freshly distilled methyl acrylate are added dropwise to a stirred mixture of 200 parts of ethyl acetoacetate and 40 parts of a dimethyl hydroxyethyl ammonium ethoxide form of a styrene-divinylbenzene resin, the ammonium groups being attached to the resin nuclei through methylene groups. The temperature during the above addition is held at 35°–40° C. by cooling. The mixture is then stirred for five hours. The resin is filtered off and the filtrate is fractionally distilled. The fraction taken at 107°–112° C./2 mm. is ethyl α-(2-carbomethoxyethyl)acetoacetate.

The optimum temperature range for reacting an alkyl acrylate and a methylenic compound having two electron-withdrawing groups is between about 25° to about 60° C.

*Example 7*

To a stirred mixture of 30 parts of hydrogen cyanide and 40 parts of a copolymer of styrene and divinylbenzene having dimethyl hydroxyethyl ammonium methoxide groups attached thereto through methylene linkages there is slowly added 50 parts of ethyl acrylate with the temperature of the reaction mixture maintained between 0° and 10° C. Stirring is then continued for two hours with the temperature rising to 25° C. The copolymer is removed by filtration. The filtrate is fractionally distilled to give ethyl β-cyanopropionate coming over at 80°–85° C./5 mm. The product contains by analysis 11.0% of nitrogen (theory 11.0%).

The reaction of hydrogen cyanide and an alkyl acrylate is best accomplished between about 0° and about 25° C. although temperatures outside of this range are possible, particularly if the reaction system is under pressure.

While the resinous quaternary ammonium alkoxides are peculiarly effective and particularly advantageous for effecting the addition of alkyl acrylates and compounds which are hydrogen donors, it is of interest to note that these alkoxide resins can also be used as catalysts in other addition reactions, although to less advantage. For intance, these resinous catalysts promote the addition reactions of acrylonitrile and compounds which are hydrogen donors.

By way of example a mixture of 50 parts of anhydrous ethyl alcohol and 25 parts of the resin used in Example 1 was treated with 50 parts of acrylonitrile with the temperature held at 30° C. with external cooling. Distillation of the reaction mixture gave 75 parts of a fraction distilling at 78°–81° C./28 mm. and consisting of β-ethoxypropionitrile.

The compounds which are obtained from the reaction of acrylic esters and compounds having active hydrogen are useful in the preparation of many organic compounds which find application in the fields of insecticides, pharmaceuticals, textile assistants, corrosion inhibitors, vitamins, soap stabilizers, and so on.

The addition process based on the resinous quaternary ammonium alkoxides is peculiarly advantageous because these alkoxides are strongly basic without causing harmful reactions due to such basicity, they do not cause saponification or hydrolysis because they can be used without the presence of water, they avoid side reactions with water, and they give more rapid reaction and provide better yields than previously known catalysts which promote addition reaction with acrylic esters.

We claim:

1. A process of preparing carboalkoxyethyl substituted compounds which comprises reacting between about 0° and 90° C. in the presence of an anion-exchange resin having quaternary ammonium alkoxide substituents as the functional portion thereof, the alkoxide groups having not over four carbon atoms, by adding together an alkyl acrylate and a compound having reactive hydrogen attached to a member of the class consisting of the oxygen of alcoholic hydroxyl groups and methylenic carbon activated by juxtaposition of an electron-withdrawing group.

2. A process for preparing carboalkoxyethyl ethers of alcohols having the hydroxyl group as the only active functional group thereof which comprises reacting between about 20° and 90° C.

in the presence of an anion-exchange resin having quaternary ammonium alkoxide substituents as the functional portion thereof, the alkoxide groups having not over four carbon atoms, by adding together a said alcohol and an alkyl acrylate, the alkyl group of which contains not over four carbon atoms.

3. A process for preparing carboalkoxyethyl ethyl ether which comprises reacting between about 20° and 90° C. in the presence of an anion-exchange resin having quaternary ammonium alkoxide substituents as the functional portion thereof, the alkoxide groups having not over four carbon atoms, by adding together ethyl alcohol and an alkyl acrylate, the alkyl group of which contains not over four carbon atoms.

4. A process for preparing carboalkoxyethyl methyl ether which comprises reacting between about 20° and 90° C. in the presence of an anion-exchange resin having quaternary ammonium alkoxide substituents as the functional portion thereof, the alkoxide groups having not over four carbon atoms, by adding together methyl alcohol and an alkyl acrylate, the alkyl group of which contains not over four carbon atoms.

5. A process for preparing carboalkoxyethyl substituted compounds which comprises reacting between about 25° and 60° C. in the presence of an anion-exchange resin having quaternary ammonium alkoxide substituents as the functional portion thereof, the alkoxide groups having not over four carbon atoms, by adding together an alkyl acrylate in which the alkyl group contains not over four carbon atoms and a compound having a reactive hydrogen-bearing methylenic group between two electron-withdrawing groups.

6. A process for preparing carboalkoxyethyl substituted compounds which comprises reacting between 25° and 60° C. in the presence of an anion-exchange resin having quaternary ammonium alkoxide substituents as the functional portion thereof, the alkoxide groups having not over four carbon atoms, by adding together an alkyl acrylate in which the alkyl group contains not over four carbon atoms and an alkyl acetoacetate.

7. The process of claim 6 in which the alkyl acrylate is ethyl acrylate.

8. The process of claim 7 in which the alkyl acetoacetate is ethyl acetoacetate.

9. A process for preparing carboalkoxyethyl substituted compounds which comprises reacting between 25° and 60° C. in the presence of an anion-exchange resin having quaternary ammonium alkoxide substituents as the functional portion thereof, the alkoxide groups having not over four carbon atoms, by adding together an alkyl acrylate in which the alkyl group contains not over four carbon atoms and a dialkyl malonate.

10. The process of claim 9 in which the dialkyl malonate is diethyl malonate.

11. A process for preparing carboalkoxyethyl derivatives of nitroalkanes which comprises reacting between 25° and 60° C. in the presence of an anion-exchange resin having quaternary ammonium alkoxide substituents as the functional portion thereof, the alkoxide group having not over four carbon atoms, by adding together a nitroalkane having hydrogen on the carbon atoms contiguous to the nitro group and an alkyl acrylate in which the alkyl group contains not over four carbon atoms.

12. The process of claim 11 in which the alkyl acrylate is ethyl acrylate.

13. The process of claim 11 in which the nitroalkane is nitropropane.

CLAUDE J. SCHMIDLE.
RICHARD C. MANSFIELD.

References Cited in the file of this patent

UNITED STATES PATENTS

| Number | Name | Date |
|---|---|---|
| 2,390,918 | Bruson | Dec. 11, 1945 |
| 2,396,626 | Wiest | Mar. 12, 1946 |
| 2,579,580 | Howk et al. | Dec. 25, 1951 |

FOREIGN PATENTS

| Number | Country | Date |
|---|---|---|
| 707,852 | Germany | July 5, 1941 |

OTHER REFERENCES

Nachod, "Ion Exchange" (Academic Press), pp. 271–2 (1949).